United States Patent Office 3,213,082
Patented Oct. 19, 1965

3,213,082
COBAMIDE DERIVATIVES
Ernest Lester Smith, North Harrow, and Leonard Mervyn, Ruislip, Middlesex, and Victor Malcolm Clark, Cambridge, England, assignors to Glaxo Group Limited, Middlesex, England, a British company
No Drawing. Filed Nov. 23, 1962, Ser. No. 239,811
Claims priority, application Great Britain, Dec. 11, 1961, 44,272/61
20 Claims. (Cl. 260—211.5)

This invention relates to a process for the preparation of vitamin $B_{12}$ coenzyme and analogues thereof.

Vitamin $B_{12}$ appears to play an important role in a number of biochemical processes and in particular in nucleic acid synthesis. In many such processes, it has been suggested that the vitamin is active in the form of an adenosyl derivative termed, for convenience, vitamin $B_{12}$ coenzyme and it has been suggested that this coenzyme may find particular application in the treatment of pernicious anaemia. Much research is at present being carried out to determine the true function of this coenzyme in cell metabolism and there exists a demand for a synthetic method of preparing it from the more readily available vitamin $B_{12}$, both in the normal and in radioactive forms. It is clearly preferable that such a synthetic method be of general application in order to enable analogues of the natural substance to be prepared and studied. Although a number of biochemical processes exist for the synthesis of vitamin $B_{12}$ coenzyme and some of its analogues such as the coenzyme form of $\psi$-vitamin $B_{12}$, these require tedious purification methods and, at the present time, have not enabled nucleosides other than adenosine to form derivatives with vitamin $B_{12}$ or its analogues or allowed vitamin $B_{12}$ analogues possessing modified side-chains on the pyrrole residues, some of which have anti-metabolite activity, to be produced in coenzyme form.

The structure of vitamin $B_{12}$ has been shown to be

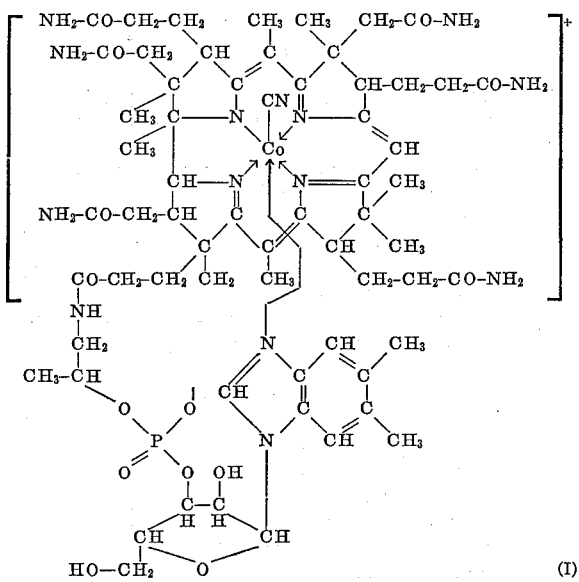

(I)

and it has now been suggested that in the coenzyme from, the —CN group is replaced by a 5′-deoxy-adenosyl group

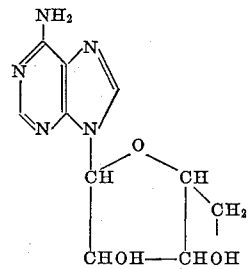

(II)

linked at the 5′-carbon atom of the ribose molecule directly to the central cobalt atom.

A large number of analogues of vitamin $B_{12}$ are known in which the molecule has been modified at one or more positions. Thus, for example, the various amide carrying side chains may be modified e.g. by removing the —$NH_2$ groups to form free acids which may, if desired, be converted into other derivatives such as esters, other amides, e.g., arylamides, etc. "Vitamin $B_{12}$," E. Lester Smith (Methuen). The 5,6-dimethyl-benziminazole part of the molecule may, if desired, be replaced by other heterocyclic bases having two or more nitrogen atoms in the ring, e.g., other benziminazoles such as benziminazole, 5-hydroxy-benziminazole, naphthiminazole etc. or by purine or pyrimidine bases such as adenine, xanthine, hypoxanthine, guanine, 2-methyl adenine, 8-aza-adenine, 2,6-diaminopurine etc. (Lester Smith, loc. cit.) The ribose moiety of the molecule may be attached to the phosphate group at a different carbon atom and the isopropylamino group linked to the phosphate group may also be replaced by other alkylamine chains (Heinrich, Friedrich and Riedel (1961) Biochem. Zeit., 334, 284). The CN group can also be replaced by another group, e.g., by a hydroxyl, nitrite, thiocyanate, sulphite group etc. A further possibility is that the nucleotide moiety of the molecule may be completely absent, as in Factor B or cobinamide (Armitage, Cannon, Johnson, Parker, Lester Smith, Stafford and Todd, J.C.S., 1953, p. 3849).

For convenience, vitamin $B_{12}$, as well as its analogues in which the molecule has been modified, are referred to in this specification by the generic term "cobamides." It will be appreciated that this term applies not only to molecules possessing amide groups but also to vitamin $B_{12}$ analogues in which the amide groups have been modified or removed.

Cobamides are normally red or orange in colour but on reduction, for example, with a borohydride, yield a brown reduced form in which the cobalt atom is generally believed to be in the divalent state. This reduction is reversible and the reduced brown compounds are easily oxidised by air to give compounds in which the molecular structure is unchanged except that the anionic group attached to central cobalt atom is usually replaced by OH if the oxidation takes place in water. Such compounds may be termed, for convenience, "reduced cobamides."

The reduction may be taken still further, however, to give compounds which are normally grey-green in colour.

(Beavan & Johnson (1955), Nature, 196, 1254.) For convenience, such compounds are referred to herein as "fully reduced cobamides." Fully reduced cobamides, like the brown-coloured "reduced cobamides," are easily oxidised in the presence of water, e.g., by air, to give the corresponding hydroxocobamide.

As will be seen, in vitamin $B_{12}$ coenzyme the nucleoside residue is linked to the central cobalt atom by a carbon-cobalt linkage. We have now discovered a method by which it is possible to prepare derivatives of cobamides characterised by an organic group being linked to the central cobalt atom by a carbon-cobalt linkage analogous to the linkage in vitamin $B_{12}$ coenzyme, such method being applicable to synthesis of the coenzyme itself from vitamin $B_{12}$. The method is also applicable to the preparation of analogous compounds having a sulphur-cobalt linkage, e.g., sulphonyl derivatives.

In principle we have thus found that derivatives of cobamides may be prepared by reaction of fully reduced cobamides with alkylating and similar agents to introduce a substituted or unsubstituted, saturated or unsaturated alkyl group or an acyl or sulphonyl group etc., at the cobalt atom. Such agents include principally compounds of the general formula RX in which X is an anion forming substituent such as a halogen atom, sulphate, phosphate, sulphonate or oxalate group, etc., and R is an unsubstituted or substituted aliphatic group or an acyl or alkyl-, aryl- or aralkyl-sulphonyl group. In particular we have found that vitamin $B_{12}$ coenzyme and analogues thereof may be produced by reacting a fully reduced cobamide with a reactive derivative of a nucleoside such as a halide or sulphonyl (e.g., tosyl, mesyl) derivative. It will be observed that R can be a sulphonate group as in p-toluene sulphonyl halides and X also can be a sulphonate group, as in adenosine p-toluene sulphonate.

In order to ensure that the starting material is not reoxidised, the reaction should be effected under non-oxidising conditions.

According to the present invention, therefore, we provide a process for the preparation of cobamide derivatives having a group R attached to the cobalt atom thereof, where R is a substituted or unsubstituted aliphatic hydrocarbon group, an acyl group or an alkyl-, aralkyl- or aryl-sulphonyl group, in which a fully reduced cobamide is condensed under non-oxidising conditions with a substituted- or unsubstituted alkylating agent, an acylating agent or an alkyl-, aralkyl- or aryl-sulphonylating agent to introduce the group R into the cobamide molecule.

The substituent X may be for example, a halogen atom, e.g., a chlorine, bromine or iodine atom, or a radical derived from a strong inorganic or organic acid, such as a sulphate or phosphate group or an alkyl- aryl- or aralkyl-sulphonate group, e.g., a methyl sulphonate or p-toluene sulphonyl group. The group R may be a substituted or unsubstituted, saturated or unsaturated aliphatic group, for example an unsubstituted alkyl group (preferably having 1-5 carbon atoms) such as a methyl, ethyl, propyl or butyl group, or an aliphatic group carrying such substituents as aryl groups (as in the benzyl group), heterocyclic groups such as pyridine, pyrimidine, piperidine, purine, adenine or uridine groups, cyclic ether or hemiacetal groups as in the saccharide or nucleoside groups, hydroxy, ether, thioether, carboxy group, etc. R may also be an acyl group such as an acetyl, propionyl, benzoyl group, etc. In anhydride acylating agents, R is an acyl group while X is an acyloxy group derived from a strong or weak carboxylic acid.

R may also be, as indicated above, a nucleoside residue. By the term nucleoside as used herein we mean an N-glycoside or deoxyglycoside of a heterocyclic base and include both the naturally occurring nucleosides such as adenosine, cytidine, inosine, guanosine, uridine etc. and their deoxy-derivatives as well as synthetic glycosides formed between naturally occurring or synthetic sugars, e.g., hexoses or pentoses, such as glucose, fructose, mannose, sorbose, ribose or deoxy derivatives thereof, and naturally occurring or synthetic heterocyclic bases. By the term nucleoside residue we mean a nucleoside group attached to the cobalt by a carbon-cobalt linkage, the hydroxy group at the linking carbon atom having been eliminated. The term 5'-deoxy- or 6'-deoxy-nucleoside residue is more accurate but the shorter and more general term is used herein for convenience.

The sugar moieties may also carry, for example, protecting groups such as acetyl, isopropylidine or benzylidine groups. The heterocyclic bases include, for example, pyridine, quinoline, isoquinoline, benziminazole, azapurine and azapyrimidine bases, etc., and especially pyrimidines and purines such as the natural bases xanthine, cytosine, hypoxanthine, guanine, adenine, uracil, etc. or synthetic bases such as 8-aza-adenine, 6-aza-uracil, 5-bromo-uracil, etc. Many nucleosides are now commercially available and can be synthesized by the methods of Duschinsky, Bleven and Heidelberger (1957) J.A.C.S., 79, 4559; M. J. Hall (1960) Ph.D. thesis, University of Manchester; Lee Benitz, Anderson, Goodman & Harper, (1961) J.A.C.S., 83, 1906, and Blackburn and Johnson (1960), J.C.S., 4347. The preferred reactive derivatives of nucleosides are the tolenesulphonyl (tosyl) and methane sulphonyl derivatives. In order to ensure that the reactive substituent is at a particular carbon atom of the sugar moiety, the reactive derivative will often be prepared from a nucleoside in which all the hydroxyl groups in the sugar moiety have been protected, with the exception of that at the carbon atom which is eventually to be bonded to the cobalt atom. The reactive derivative may be treated to remove such protecting groups before reaction with the fully reduced cobamide or such groups may be left in position. If desired, they may be removed from the resulting coenzyme or coenzyme analogue by subsequent treatment, e.g., with a mineral acid such as hydrochloric, sulphuric acid, etc., or a strong organic acid such as formic acid or in many cases, e.g., with acetoxy groups, with mild bases such as alcoholic ammonia or amines such as morpholine, dilute alkali metal alkoxides, hydroxides, carbonates, etc., or, in some instances, by reduction.

Protecting groups are generally chosen for their ease of removal, for example, acyl groups such as acetyl, propionyl groups etc. Where one or more pairs of adjacent hydroxyl groups are to be protected it is convenient to form an acetal or ketal derivative, e.g., a benzylidine or, preferably, an isopropylidine derivative. Where the sugar moiety of the nucleoside possesses a primary alcohol grouping, as in ribose, glucose, etc., it is preferred that it is the primary alcohol hydroxy group which is replaced by a more reactive substituent. Thus, for example, when it is desired to prepare vitamin $B_{12}$ coenzyme itself or an analogue differing therefrom only in the vitamin $B_{12}$ part of the molecule, the nucleoside required is adenosine and the preferred reactive derivative of 5'-(toluenesulphonyl)-adenosine.

The reaction between the compound RX and the fully reduced cobamide is preferably effected in an inert solvent for the reactants advantageously a polar solvent, for example, water or an alkanol such as methanol, ethanol, etc., or a substituted amide solvent such as dimethylformamide or dimethylacetamide.

The non-oxidising reaction conditions can conveniently be achieved by conducting the reaction in an inert atmosphere, for example, nitrogen. It is especially convenient to effect the reduction of the cobamide using, for example, a metal hydride reducing agent such as an alkali metal borohydride, and with or without decomposition or removal of the unused reducing agent, to add the other reactant directly to the reaction solution. If desired, excess borohydride can be decomposed when reduction of the cobamide is complete, by adding an organic acid such as acetic acid before or together with the reactant. Other reducing agents which may be used for the reduction include low-valency metal ion reducing agents, such as chromous acetate or zinc and acetic acid, etc.

The cobamide starting material is most conveniently a hydroxocobamide. Although cyanocobamides, sulphito cobamides etc. can readily be used, it is then usually advisable to remove the liberated HCN or $SO_2$ before the condensation reaction since these substances otherwise compete with the condensing reactant to re-form the initial cobamide. Thus, for example, when cyano-cobalamin is the starting compound, the solution formed by reduction is preferably acidified and warmed under reduced pressure to remove HCN.

The derivatives of vitamin $B_{12}$ are of particular use in experimentation and therapy based on vitamin $B_{12}$ metabolism. A number of derivatives are especially valuable as antimetabolites of the coenzyme, so serving to retard processes in which the vitamin plays an essential part. Compounds of special utility include, in particular, the coenzyme analogues formed from vitamin $B_{12}$ analogues which themselves function as antimetabolites.

The products which may be prepared by the process according to this invention are new compounds, with the exception of vitamin $B_{12}$ coenzyme and the Co-5'-deoxyadenosyl derivatives of other cobamides having the same side chains attached to the pyrrole rings as are present in vitamin $B_{12}$ itself; such new compounds constitute a further feature of the invention. Compounds which have proved powerfully antagonistic to vitamin $B_{12}$ coenzyme include those in which the adenosine moiety of the coenzyme is replaced by an ethyl group, a uridine or inosine group or an isopropylidene adenosine group. The methyl derivative is also valuable because in appropriate biological systems it appears to act as a coenzyme involved in methyl group transfer to homocysteins to form methionine.

In order that the invention may be well understood we give the following examples by way of illustration only:

*Example 1.—Preparation of isopropylidine coenzyme*

Isopropylidine adenosine was converted to the p-toluene sulphonyl (tosyl) ester by reaction with tosyl chlorine solution, following the method of Clark et al. (1951), J. Chem. Soc. 2952. Because of its tendency to cyclise, the reagent was used directly it was ready. A reaction flask with separating funnels was set up in such a way that the whole system could be evacuated and filled with pure nitrogen two or three times, to eliminate all oxygen, and reagents could then be added when desired, in the closed system. The flask contained 700 mgs. hydroxocobalamin in 20 ml. of water, one funnel 200 mgs. sodium borohydride in 10 ml. of water, and another the crude tosyl compound made from 500 mgs. isopropylidine adenosine dissolved in 10 ml. of 50% aqueous methanol. On adding the borohydride to the vitamin, the colour changed instantly from red to brown, then slowly to a greenish black. After 15 minutes the tosyl compound was added, and the colour slowly changed to a red-brown. After 45 minutes at room temperature air was admitted and the mixture was shaken to re-oxidise any remaining reduced vitamin $B_{12}$. The alkaline solution was neutralised with dilute hydrochloric acid and extracted with phenol carbon tetrachloride 3:1 in small portions till the aqueous layer was nearly colourless. The combined extracts were washed with water, mixed with about ten parts of carbon tetrachloride-acetone 10:1 and shaken with small portions of water till all red colour was removed.

The product was purified by chromatography on columns of DEAE (diethyl aminoethyl) cellulose (3" x 1") followed by CM (carboxymethyl) cellulose (6" x 1"), developed with water. Nearly all the colour washed quickly through DEAE cellulose. The effluent and washes were applied to the CM cellulose column, which was further developed with water. A small red zone travelled quickly down and out of the column and was set aside. An orange zone travelled down more slowly and came out as a red solution (which turned yellow on acidification); elution was continued as long as this fraction continued to emerge, in a total of 850 ml. One half of this fraction (425 ml.) was concentrated to a few ml. under reduced pressure; it crystallised slowly after adding acetone to slight turbidity. This product showed the characteristic absorption spectrum of the coenzyme, at pH 7 and at pH 2. On paper chromatography with wet secondary butanol the $R_f$ value (relative to that of cyanocobalamin) was 1.65. It yielded adenine on acid hydrolysis. In the enzyme assay system it powerfully inhibited the natural $B_{12}$ coenzyme.

*Example 2.—Preparation of $B_{12}$ coenzyme*

The second half of the product from Example 1, in 425 ml. water, was made 0.1 N with hydrochloric acid and heated at 90° C. for 15 minutes. The solution was neutralised at cooled, then concentrated and freed from salts by extraction via phenol-carbon tetrachloride (as described in Example 1). On paper chromatography the major zone was orange in colour, and had an $R_f$ value (relative to cyanocobalamin) of 0.71, the same as that of the natural coenzyme.

The product was purified from acidic and basic hydrolysis products by passing through small columns of DEAE and CM ion-exchange celluloses. The coenzyme (75 mg.) emerged slowly in a total volume of 540 ml. The solution was concentrated and the coenzyme was crystallised from aqueous acetone. It had the same absorption spectrum and the same activity in the specific enzyme assay system of Abeles et al., as the natural coenzyme from Propionibacteria.

*Example 3.—Preparation of coenzyme*

250 mg. of adenosine dried at 0.01 mm. at 110° was dissolved with heat in 20 ml. of dry pyridine. After cooling to 0° C. one equivalent of acetic anhydride was added, followed after 1 hour by 1.1 equivalents of p-toluene sulphonyl chloride. The solution was left overnight at room temperature, then treated with a few drops of water and 200 ml. of ether.

The yellow gummy precipitate of crude tosyl adenosine was taken up in 10 ml. of water and used at once.

100 mg. of hydroxocobalamin was reduced with chromous acetate in 10 ml. EDTA buffer at pH 10. When the colour change to bluish black was complete, 1 ml. of N hydrochloric acid was added followed by the crude tosyl adenosine. After 45 minutes at room temperature the solution was processed as described in Example 1. A weak pink zone followed by an orange zone travelled down the CMC column and emerged with no evident break between them, as pink solution, turning yellow with acid and showing the typical coenzyme spectrum. The product showed coenzyme activity in the enzyme assay. It was further purified by chromatography on Whatman 3MM paper with wet sec. butanol: the major zone was orange in colour and had the same $R_f$ value as the natural coenzyme.

*Example 4.—Preparation of isopropylidene uridine analogue*

Isopropylidine uridine was converted to the tosyl ester. 50 mgs. of the crude product dissolved in 2 mls. of ethanol, was added to reduced hydroxocobalamin prepared from 50 mgs. hydroxocobalamin in 2 mls. of ethanol treated with 10 mgs. of sodium borohydride in 1 ml. of ethanol, followed by 0.2 ml. of glacial acetic acid. The reaction was carried out in pure nitrogen is a closed system. The reaction mixture was left at room temperature for 65 hours. The alcohol was distilled off under reduced pressure and the product was extracted via phenol as in Example 1, and brought back into a few mls. of aqueous solution. This was run through a short column of DEAE cellulose followed by water. The effluent and washings were run through a column of carboxymethyl cellulose. A cherry red zone passed down the column and was eluted with water as a red solution which gave the characteristic absorption spectrum of the $B_{12}$ coenzyme. The yield calculated from the density values was 21 mgs. The solution turned yellow with acid; after exposure to daylight for 2 hours it had turned pink again and showed the characteristic absorption spectrum of hydroxocobalamin.

A neutral solution was also quantitatively converted to hydroxocobalamin on exposure to daylight; after this treatment the red colour was strongly held by carboxymethyl cellulose. The remainder of the product from the CMC column was concentrated under reduced pressure; on adding acetone it crystallised rapidly in red needles. On paper chromatography with wet secondary butanol the product had an $R_f$ value (relative to that of cyanocobalamin) of 1.29.

*Example 5.—Preparation of uridine analogue*

5 mgs. of the isopropylidine uridine analogue (see Example 4) was dissolved in 2.5 mls. of 0.1 N hydrochloric acid. The solution was left for 38 hours in the refrigerator then for 7 hours at room temperature. The solution was then run through small columns of DEAE and CM celluloses. Some colour was held at the top of the CMC column but most of the material passed down the column as an orange red zone and came out as a pink solution on development with water. This effluent was concentrated and subjected to paper chromatography. It gave 2 orange zones of approximately equal intensity, one with relative $R_f$ 1.30 due to unchanged isopropylidine uridine analogue and the other with relative $R_f$ 0.62 due to the uridine analogue.

*Example 6.—Preparation of uridine analogue*

Tosyl uridine was prepared by acid hydrolysis of the isopropylidine compound according to the method of J. Baddiley (1951), J. Chem. Soc. 13, 50. 50 mgs. of hydroxocobalamin in 2 mls. of water was treated with 20 mgs. of sodium borohydride in 2 mls. of water during 15 minutes at room temperature in a nitrogen atmosphere. 50 mgs. of tosyl uridine suspended in 5 mls. of water was added. The colour slowly changed from grey-green to cherry red. After 1 hour at room temperature the solution was extracted via phenol carbon tetrachloride and the resulting aqueous solution run through columns of DEAE and CM cellulose as in Example 1. The effluent from the second column was concentrated under reduced pressure and crystallised with acetone yielding 42 mgs. of red needles. On paper chromatography this material gave a single zone with relative $R_f$ 0.59 showing that it was the same product as that prepared by hydrolysis of the isopropylidine compound (see Example 5). This uridine analogue powerfully inhibited the natural coenzyme in the enzyme assay system.

*Example 7.—Preparation of the uridine coenzyme analogue of the "$B_{12}$ Anilide"*

"Vitamin $B_{12}$ anilide" was prepared by treating the monocarboxylic acids derived from vitamin $B_{12}$ by mild hydrolysis with ethyl chlorformate and triethylamine in dimethyl formamide as described by Lester Smith et al. (1956), Biochem. J., 62, 14 p. The resulting cyano compound was converted to the "aquo-anilide" by reduction with aqueous sodium borohydride, addition of acetic acid and concentration under reduced pressure to remove hydrocyanic acid. The product was extracted via phenol and crystallised from aqueous acetone. 25 mgs. of this compound was reduced with 5 mgs. of sodium borohydride in 3 mls. of ethanol in a nitrogen atmosphere. After 5 minutes 0.05 ml. of glacial acetic acid was added followed by 140 mgs. of tosyl uridine suspended in 10 mls. of ethanol. The reaction mixture was left overnight at room temperature then heated at 60° C. for 1 hour. Alcohol was removed under reduced pressure and the product was extracted via phenol carbon tetrachloride and run through DEAE and CMC columns. A weak pink zone came through the columns quickly and was rejected. The slower orange zone was eluted in approximately 50 mls. with water.

*Example 8.—Preparation of isopropylidine inosine analogue*

100 mgs. of hydroxocobalamin was reduced with 20 mgs. of sodium borohydride in 5 ml. of ethanol. 0.1 ml. of glacial acetic acid was added followed by crude tosyl isopropylidine inosine prepared from 125 mgs. of isopropylidineinosine, suspended in 5 ml. of ethanol. The reaction mixture was left for 24 hours at room temperature and was processed as described in the previous example. The main fraction from the CMC column was concentrated and crystallised from aqueous acetone. The product had $R_f=1.22$ relative to vitamin $B_{12}$ on paper chromatography with wet sec. butanol.

*Example 9.—Preparation of inosine analogue*

Half the product of Example 8, the isopropylidine inosine analogue, was dissolved in 10 mls. of 0.1 N hydrochloric acid and heated for 15 minutes at 90° C. The solution was cooled, neutralised with sodium hydroxide and extracted via phenol. On paper chromatography the major zone had a relative $R_f$ value of 0.54.

*Example 10.—Preparation of inosine analogue*

Tosyl isopropylidine inosine made from 125 mgs. of isopropylidine inosine was hydrolysed with dilute sulphuric acid to remove the isopropylidine group. 200 mgs. of nitritocobalamin in 10 ml. of water was treated with 75 mgs. of sodium borohydride in 4.5 ml. of water for 30 minutes in a nitrogen atmosphere. The tosyl inosine was added in 10 ml. of aqueous solution and the mixture left for 1 hour at room temperature. The reaction mixture was extracted and purified on the 2 ion-exchange celluloses as described in previous examples. A paper chromatogram of the product showed an orange zone with a relative $R_f$ value of 0.53 showing that the product was the same as that obtained by hydrolysis of the isopropylidine inosine analogue. The material crystallised from aqueous acetone in dark red granules. This substance had the typical absorption spectrum of the coenzyme. It was a powerful inhibitor of the natural coenzyme.

*Example 11.—Preparation of ethyl analogue*

50 mgs. of hydroxocobalamin was reduced with 10 mgs. of sodium borohydride in 4 ml. of ethanol. 0.05 ml. of acetic acid was added followed by 0.25 ml. of ethyl iodide in 2 ml. of ethanol, the whole reaction being carried out in a nitrogen atmosphere. The mixture was left at room temperature overnight. Alcohol was removed by distillation under reduced pressure and the product purified by extraction via phenol carbon tetrachloride and ion-exchange cellulose columns. A weak pink fore-run was rejected and the product from an orange zone was collected in 330 ml. of water. This solution was concentrated under reduced pressure to a few ml. and crystallised by adding acetone. On paper chromatography the product gave an orange zone with a relative $R_f$ value of 1.85 and a weak red zone with the $R_f$ value of hydroxocobalamin.

*Example 12.—Preparation of hydroxyethyl analogue*

50 mgs. of hydroxocobalamin in 2 ml. of water was reduced with 20 mgs. of sodium borohydride in 2 ml. of water in a nitrogen atmosphere. After 15 minutes 0.25 ml. of ethylene bromohydrin in 1 ml. of water was added. The solution changed colour almost instantly from grey-green to cherry red. After standing for 15 minutes at room temperature the solution was extracted via phenol carbon tetrachloride and purified on columns of DEAE and CM celluloses Most of the colour travelled down the second column as an orange red zone coming off as a red solution. The absorption spectrum of this product at pH 7 and at pH 2 was exactly the same as that of the coenzyme except that the peak at 260 m$\mu$ (due to the adenine in the coenzyme) was missing. The yield calculated from the density values was 36 mgs. On paper chromatography with wet sec. butanol the relative $R_f$ value was 0.95. The hydroxyethyl analogue crystallised from aqueous acetone in dark red needles.

*Example 13.—Preparation of methyl analogue*

20 mgs. of hydroxocobalamin and 10 mgs. of chromous acetate were dissolved in 2 ml. of ethylene-diamine tetraacetic acid buffer at pH 9.5 in a nitrogen atmosphere. After 10 minutes 0.2 ml. of the dimethyl sulphate suspended in 2 ml. of water was added. The colour changed instantly from blue-green to red. After 15 minutes the solution was decanted from the excess dimethyl sulphate and extracted via phenol carbon tetrachloride. The product was recovered in about 1 ml. of water and acetone was added to faint turbidity; crystallisation was complete in 10 minutes. The yield was 17 mgs. The absorption spectrum was identical with that of the natural coenzyme except for the absence of the peak at 260 m$\mu$. On paper chromatography the product had an $R_f$ value of 1.6 relative to vitamin $B_{12}$.

The experiment was repeated using 0.05 N acetic acid instead of EDTA buffer. Under these conditions reduction proceeds only to the brown product (vitamin $B_{12r}$) containing divalent cobalt, as shown by Beaven & Johnson (1955), Nature, 176, 1264. On adding the methyl sulphate there was no colour change. After 1 hour the reaction mixture was shaken with air, extracted via phenol and the final aqueous solution was run through small columns of DEAE and CM celluloses. Practically all the colour was held at the top of the CMC column showing that the material was unchanged hydroxocobalamin.

*Example 14.—Preparation of methyl analogue*

25 mgs. of hydroxocobalamin was reduced with excess zinc dust in 5% aqueous acetic acid until the colour was grey-green. The solution was filtered in a nitrogen atmosphere into a vessel containing 0.2 ml. of dimethyl sulphate. The colour changed to red instantly. After 15 minutes the solution was processed as in the previous example. The resulting methyl analogue of the coenzyme had the same $R_f$ value as the product of the first part of Example 13.

*Example 15.—Preparation of acetyl analogue*

50 mg. of hydroxocobalamin was reduced to the grey-green stage with chromous acetate in 7.5 ml. EDTA buffer at pH 10, in a nitrogen atmosphere. On adding 0.25 ml. of acetyl chloride, the solution turned orange-red almost immediately. After 45 minutes at room temperature the mixture was processed as described in Example 1. The effluent from the CMC column was slightly more orange in tint than the coenzyme, and had an absorption maximum at 510 m$\mu$ instead of 520 m$\mu$; moreover the change to a yellow colour in acid solution was complete at pH 3.5, whereas the coenzyme requires acidifying to pH 2 before the change is complete. Otherwise, the spectrum resembled that of the coenzyme. The yield, assessed spectroscopically, was 31 mg. The product crystallised from aqueous acetone in long red needles (yield 27 mg.). It powerfully inhibited the natural coenzyme in the enzyme assay system.

*Example 16.—Preparation of benzyl analogue*

50 mg. of hydroxocobalamin was reduced with 12 mg. sodium borohydride in 5 ml. of water for 15 minutes. 0.2 ml. of benzyl bromide suspended in 2 ml. of water was added and the mixture shaken at intervals during 1½ hours although the colour change from brownish-black to red appeared complete in a few minutes. The aqueous solution was decanted from the remaining few drops of benzyl bromide and was processed as described in Example 1. The benzyl coenzyme analogue travelled down the CMC column as a brown zone emerging as a red solution.

*Example 17.—Preparation of carboxymethyl analogue*

150 mgs. of cyanocobalamin in 10 ml. of water was treated with 1 g. of zinc dust and 1 ml. of glacial acetic acid while the flask was warmed gently under reduced pressure to remove HCN. When reduction was complete, nitrogen was admitted and the mixture was filtered in a closed system in nitrogen, into 250 mg. monochloracetic acid. The nearly black filtrate turned red at once. After standing for 30 minutes the solution was allowed to percolate through a bed of charcoal (1 g. Sutcliffe Speakman No. 5) and kieselguhr (1 gm.). Almost all the red colour was adsorbed. After washing the bed thoroughly with water it was eluted with 70% acetone and further acetone was added to the eluate to promote crystallisation; the crystals were dissolved in 3 ml. of water and run through a small bed (2" x ½") of DEAE cellulose. Some red material passed through, but the acidic carboxymethyl analogue was held tightly and was eluted with N/100 hydrochloric acid as a red solution. This turned yellow on acidification and the acid solution quickly turned red again on exposure to light. The absorption spectrum resembled that of the coenzyme, but there were minor differences. It showed weak peaks at 350 m$\mu$, 422 m$\mu$ and 525 m$\mu$.

*Example 18.—Preparation of p-toluene sulphonyl (tosyl) analogue*

Hydroxocobalamin was fully reduced with chromous acetate in EDTA buffer at pH 10 in a nitrogen atmosphere. A considerable excess of p-toluenesulphonyl chloride dissolved in ethanol, was added. The colour changed from nearly black to red instantly. The reaction mixture was processed via phenol extraction, when it was noted that on washing with dilute HCl the phenol extract became green, and reverted to dark red on washing with water. The aqueous solution was purified by passage through columns of DEAE and CM celluloses, which held back very little colour: the tosyl analogue passed through with only slight retardation. The effluent was concentrated and on adding acetone the product crystallised in almost black needles.

The absorption spectrum was intermediate in character between those of the cobalamins and the coenzyme. It showed a peak in the visible region at 520 m$\mu$, an inflexion at 365 m$\mu$, and a weak peak at 351 m$\mu$. The ratio of intensities at 350 and 520 m$\mu$ was 2.8, compared with 3.4 for hydroxocobalamin and 1.75 for the coenzyme.

*Example 19.—Preparation of $B_{12}$ coenzyme*

Crude tosyl adenosine prepared by direct tosylation of adenosine, and containing approximately 0.5 gm. of actual 5'-tosyl adenosine, was dissolved in 20 ml. of 50% aqueous methanol.

4 gm. of crystalline hydroxocobalamin and 1 gm. of sodium borohydride were placed in a dry flask which was three times evacuated and refilled with oxygen-free nitrogen. 40 ml. of de-aerated water was added under nitrogen and the mixture was shaken at intervals for 4 minutes. The solution of crude tosyl adenosine was de-aerated and added gradually, making provision for the escape of liberated hydrogen. The solution changed from greenish black to bright orange-red; it was left in the dark for 1½ hours at room temperature.

50 ml. of water was added and the solution was extracted with small portions of phenol-carbon tetrachloride 3:1 till all the red colour was removed. The bulked extracts were washed successively with small portions of sodium hydroxide solution (added until the aqueous layer remained at about pH 8 after shaking), water, 0.05 N hydrochloric acid, and water again. About 20 ml. of acetone and 50 ml. of water were added and sufficient ether to bring substantially all the colour into the aqueous layer after shaking; this was separated and washed with more ether to remove phenol.

Columns were prepared with DEAE cellulose and CM cellulose, both in floc form, of packed height about 4" x 1". The product was run through these columns in series, followed by distilled water till no more colour emerged from the second (CM) column. The effluent was concentrated to about 50 ml. under reduced pressure, and run through smaller columns (about 3" x ½") of the two ion-exchange celluloses. The effluent was again concentrated, then acetone was added to faint opalescence; as crystals formed, more acetone was added at intervals until the bulk of the product crystallised. The yield of air-dried crystalline $B_{12}$ coenzyme was 3.25 gm. The operations were screened from light at all stages.

*Example 20.—Preparation of $B_{12}$ coenzyme via 2'3' diacetyl tosyl adenosine*

267 mg. dried adenosine and 279 mg. triphenyl methyl chloride were mixed in 25 ml. dry pyridine and left 5 hours with occasional shaking. At the end of this period complete solution had occurred. 1.0 ml. acetic anhydride was then added to the pale yellow solution and the mixture left at room temperature for 18 hours. The solution was then concentrated under high vacuum to about 10 ml. and ether added. Vigorous shaking deposited a brown oil on the side of the flask. The ether was poured off and after further washing with ether followed by removal of traces of ether under vacuum the brown oil was dissolved in 10 ml. of 80% acetic acid and heated on a boiling water bath for 30 minutes to hydrolyse the triphenyl methyl ether. After allowing to cool to room temperature the resulting solution was freeze-dried.

The freeze-dried material was dissolved in 5 ml. dry pyridine, the solution cooled in ice and 187 mg. p-toluene sulphonyl chloride added. It was then left at room temperature overnight. 2 ml. water were added to the solution followed by 20 ml. ice-cold saturated sodium bicarbonate solution. This mixture was then extracted with 3 x 20 ml. ice-cold chloroform and the combined chloroform extracts washed with 2 x 40 ml. ice-cold saturated sodium hydrogen sulphate solution. Finally the extract was washed with 2 x 40 ml. ice-cold water. Chloroform was removed under vacuum at room temperature and the flask finally evacuated to 0.01 mm. to leave a yellow oil.

Hydroxocobalamin was reduced to the green stage by reacting 250 mg. hydroxocobalamin with 125 mg. sodium borohydride in 5 ml. water under anaerobic conditions then adding 0.25 ml. acetic acid in 2 ml. water. To this mixture was added the tosyl diacetyl adenosine dissolved in 1 ml. water and 1 ml. methanol. The reaction mixture went red almost immediately and after leaving in the dark for 3 hours the diacetyl coenzyme was processed by conventional methods. Unchanged hydroxocobalamin was removed on a carboxymethyl cellulose ion-exchange column after first passing the solution through a diethylaminoethyl cellulose ion-exchange column.

The purified diacetyl coenzyme which was homogeneous on chromatography in sec. butanol/water ($R_f$ relative to $B_{12}=1.75$) was freeze-dried to yield 40 mg. product. The whole of this material was dissolved in 20 ml. anhydrous methanol and 10 mg. anhydrous morpholine added. After leaving in the dark at room temperature for 2 hours the product was isolated by precipitation with ether. Paper chromatography of the product in sec. butanol/water indicated that hydrolysis of both acetyl groups was complete yielding pure vitamin $B_{12}$ coenzyme.

*Example 21.—Preparation of acetyl analogue*

100 mg. of hydroxocobalamin was reduced with sodium borohydride to the greenish-black stage. Excess of ethyl acetate was added but this did not react as judged by the unchanged colour after 15 minutes. Acetic anhydride was then added and the colour changed instantly to orange-red. The reaction mixture was processed via phenol carbon tetrachloride and purified with columns of DEAE and CM cellulose. It was crystallised from aqueous acetone. On paper chromatography the product had an $R_f$ value relative to $B_{12}$ of 1.40, the same as the product of Example 15.

*Example 22.—Prepaartion of ethyl analogue*

50 mg. of hydroxocobalamin was reduced with chromous acetate in EDTA buffer at pH 10. An excess of triethyl phosphate was added, the mixture was shaken at intervals. The colour gradually changed to red and the preparation was extracted via phenol chloroform after 2 hours. The product was purified by chromatography through DEAE and CM celluloses and crystallised from aqueous acetone. The absorption spectrum and behaviour on paper chromatography was the same as that of the ethyl analogue made with ethyl iodide as described in Example 11.

*Example 23.—Preparation of ethyl analogue*

100 mg. of hydroxocobalamin was reduced in nitrogen with 25 mg. of sodium borohydride. 200 mg. of the ethyl ester of p-toluene sulphonic acid in 2 ml. of ethanol was added, when the colour changed from dark green to bright red instantly. The product was purified and crystallised as described in the previous example. The yield of ethyl analogue was 90 mg. It had the same $R_f$ value as the product of the previous example and of Example 11.

*Example 24.—Preparation of methyl analogue*

100 mg. of hydroxocobalamin was fully reduced with sodium borohydride and treated with 0.2 gm. of methyl oxalate dissolved in 2 ml. of methanol. The colour changed slowly to reddish-brown and the mixture was processed and purified as described in previous examples. The yield of crystalline methyl analogue was 25 mg.

*Example 25.—Preparation of bromo-uridine analogue*

120 mg. of hydroxocobalamin was treated in nitrogen with 20 ml. of 10% acetic acid and 3 gm. of zinc dust. When the colour had changed to green, the reaction mixture was filtered through sintered glass in nitrogen onto 100 mg. of tosyl bromo-uridine. After 1 hour the solution was shaken with air, extracted with phenol-carbon tetrachloride and the extract washed in turn with dilute sodium hydroxide, dilute hydrochloric acid and water. It was then shaken with water, acetone and excess carbon tetrachloride. The aqueous layer was run through columns of DEAE and CM cellulose in turn followed by water. The effluent was concentrated and crystallised from aqueous acetone yielding 50 mg. of the bromo-uridine analogue of the coenzyme. Its $R_f$ value relative to $B_{12}$ was 0.75.

*Example 26.—Preparation of methanesulphonyl (mesyl) analogue*

100 mg. of hydroxocobalamin was reduced with 50 mg. of chromous acetate in 10 ml. of EDTA buffer at pH 10. After 15 minutes, 0.25 ml. of methane-sulphonyl chloride was added; the colour changed from dark green to red instantly. After 15 minutes the mixture was extracted and purified as described in earlier examples. The yield of purplish-black crystals was 50 mg.

The absorption spectrum showed peaks at 363 and 520 mμ and was rather similar to the spectrum of the tosyl compound described in Example 18. On paper chromatography the $R_f$ value relative to $B_{12}$ was 0.70.

*Example 27.—Preparation of methyl analogue of $B_{12}$ monocarboxylic acid*

200 mg. of purified monocarboxylic acid derived from mild hydrolysis of vitamin $B_{12}$ was reduced with 100 mg. of sodium borohydride and 5 ml. of water. 0.2 ml. of methyl iodide in 5 ml. of methanol was added, in nitrogen, when the colour changed instantly from dark green to red. After 10 minutes the methanol was removed by warming under reduced pressure and the solution was extracted via phenol-carbon tetrachloride. The product could not be induced to crystallise and was freeze-dried. It gave an absorption spectrum closely similar to that of the $B_{12}$ coenzyme and showed the same colour change from red to yellow on acidification.

*Example 28.—Prepaartion of uridine analogue of $B_{12}$ monocarboxylic acid*

200 mg. of the purified monocarboxylic acid from $B_{12}$ was treated with 10 ml. of 10% acetic acid and 1 gm. of zinc dust. The mixture was warmed under reduced pressure to remove hydrocyanic acid. Nitrogen was admitted and the solution filtered through the sinter onto a suspension of 200 mg. tosyl uridine in 5 ml. of water. After 2 hours the solution was extracted via phenol-carbon tetrachloride including an alkali wash to remove acetic acid. The aqueous solution was added to a column of DEAE cellulose. The acidic product was held and impurities were washed through with water. The desired product was eluted with dilute sodium chloride solution. This eluate showed the usual colour change from red to yellow on acidification. The product was again extracted via phenol-carbon tetrachloride and was freeze-dried.

*Example 29.—Preparation of $B_{12}$ coenzyme via mesyl adenosine*

Crude methanesulphonyl (mesyl) adenosine prepared by direct mesylation of adenosine, and containing about 0.1 gm. of actual mesyl adenosine, was dissolved in 10 ml. of 50% aqueous methanol.

0.8 gm. hydroxocobalamin was treated with 0.2 gm. sodium borohydride and 8 ml. of water in a nitrogen atmosphere. After 5 minutes the de-aerated solution of mesyl adenosine was added, and the red solution was processed after standing for 1 hour in the dark as described in Example 19. The yield of crystalline product was 0.595 gm. Chromatography on paper showed that this was substantially coenzyme $B_{12}$ slightly contaminated with two faster-running coenzyme-like substances.

*Example 30.—Preparation of the the coenzyme form of the "$B_{12}$ anilide"*

The vitamin $B_{12}$ anilide in its aquo-form was prepared as described in Example 7. 200 mg. of this compound was dissolved in 4 ml. of water and treated, under nitrogen, with 60 mg. sodium borohydride in 2 ml. of water. Crude tosyl adenosine containing about 50 mg. of the pure substance was dissolved in 2 ml. 50% methanol, degassed and added to the fully-reduced anilide, After 1 hour the red solution was processed as described in earlier examples. The product would not crystallise and was preserved in the freeze-dried form.

*Example 31.—Preparation of the coenzyme form of factor B (cobinamide)*

Cobinamide was prepared by removing the nucleotide from vitamin $B_{12}$ with perchloric acid (Armitage, Cannon, Johnson, Parker, Lester Smith, Stafford and Todd, J. Chem. Soc., 1953, 3849). 200 mg. of the chromatographically purified freeze-dried product and 60 mg. of sodium borohydride were allowed to react under nitrogen in 7 ml. of water. 0.12 ml. of glacial acetic acid in 2 ml. of water was added and the solution was gently warmed under reduced pressure to remove HCN. Crude tosyl adenosine containing about 50 mg. of the pure substance was added, dissolved in 5 ml. of 50% methanol. The preparation turned slowly from greenish-black to deep yellow. After 1 hr. the product was extracted as in earlier examples via phenol-carbon tetrachloride, and was then run through a small column of DEAE cellulose. The effluent was concentrated and freeze-dried. The product was yellow in solution at all pH values: the spectrum resembled that of the "adenyl coenzyme" derived from pseudo-vitamin $B_{12}$.

*Example 32.—Preparation of "methyl cobinamide"*

Factor B (cobinamide) was prepared as described in the preceding example. 75 mg. in 2 ml. water was reduced with 25 mg. sodium borohydride, then warmed in vacuo with 0.061 ml. acetic acid in 1 ml. water to remove HCN. To ensure complete reduction another 25 mg. sodium borohydride in 1 ml. water was added followed by 0.2 ml. methyl iodide. The yellow solution was processed as in the preceding example to a freeze-dried solid. The spectrum resembled that of the combinamide coenzyme.

*Example 33.—Preparation of deoxyadenosine coenzyme analogue*

225 mg. of dried deoxyadenosine was treated with an equal weight of toluenesulphonyl chloride in 5 ml. of pyridine. After standing overnight at room temperature 5 ml. of ice-cold saturated solution of sodium bicarbonate was added and the crude tosyl compound was extracted with 10 ml. then 5 ml. of chloroform. The extracts were evaporated to dryness under reduced pressure and the residue was redissolved in 3 ml. of methanol. 250 mg. of hydroxocobalamin in 7 ml. of water was reduced with 35 mg. of sodium borohydride under nitrogen, and after 15 minutes this solution was added to the solution of tosyl compound. After 1 hour the red solution was processed as described in previous examples and was finally crystallised from aqueous acetone in a yield of 173 mg. The substance had an absorption spectrum closely resembling that of coenzyme $B_{12}$.

We claim:

1. A process for the preparation of an R-substituted cobamide derivative where R is attached to the central cobalt atom by carbon-cobalt and sulfur-cobalt linkages and is selected from the group consisting of alkyl, alkyl substituted with at least one member selected from the group consisting of monocyclic aryl, nitrogen-containing heterocycle, oxygen-containing heterocycle, nitrogen and oxygen-containing heterocycle, hydroxyl and carboxyl; alkoxy, alkylthio, alkanoyl, monocyclic aroyl, alkyl-sulfonyl, monocyclic aryl-sulfonyl and monocyclic aralkyl-sulfonyl comprising condensing a fully reduced cobamide under non-oxidizing conditions with a corresponding compound selected from the group consisting of alkylating agents, acylating agents and sulfonylating agents and introducing the group R as above defined into the cobamide molecule.

2. A process as claimed in claim 1 in which the reagent condensed with the fully reduced cobamide is a reagent of the formula RX where R is defined as in claim 1 and X is a reactive anion-forming substituent.

3. A process as claimed in claim 2 in which X is a member selected from the group consisting of chlorine, bromine, iodine, a lower alkyl-sulfonate, a monocyclic lower aralkyl-sulfonate, a monocyclic arylsulfonate, sulphate, phosphate and oxalate.

4. A process as claimed in claim 2 in which R is a member selected from the group consisting of natural glycosides and synthetic glycosides of pyridine, quinoline, isoquinoline, benziminazole, azapurine, azapyrimidine, pyrimidine, purine, xanthine, cytosine, hypoxanthine, guanine, adenine, uracil, 8-aza-adenine, 6-aza-uracil and 5-bromo-uracil with a member selected from the group consisting of glucose, fructose, mannose, sorbose and ribose and deoxy-derivatives thereof.

5. A process as claimed in claim 4 in which at least one hydroxyl of the glycoside is protected.

6. A process as claimed in claim 5 in which the protecting groups are selected from the group consisting of acyl, acetal and ketal.

7. A process as claimed in claim 4 in which R is 5'-deoxyadenosyl.

8. A process as claimed in claim 4 in which R is 2',3'-isopropylidine-5'-deoxy-adenosyl.

9. A process as claimed in claim 1 in which the fully reduced cobamide is selected from the group consisting of fully reduced Vitamin $B_{12}$, fully reduced Vitamin $B_{12}$ monocarboxylic acid, fully reduced Vitamin $B_{12}$ monocarboxylic acid anilide and fully reduced Vitamin $B_{12}$ monocarboxylic acid lactam prepared by reduction of the corresponding cobalamin selected from the group consisting of hydroxo-, cyano-, sulfito-, thiocyanato- and nitritocobalamins.

10. A process as claimed in claim 1 in which the fully reduced cobamide is prepared by reducing a cobamide with a reducing agent selected from the group consisting of a metal hydride reducing agent, a low-valency metal ion reducing agent and a dissolving metal reducing agent.

11. A process as claimed in claim 10 in which the reducing agent is an alkali metal borohydride.

12. A process as claimed in claim 10 in which the cobamide and reducing agent reaction mixture is condensed according to the process set out in claim 1 without isolation of the fully reduced cobamide.

13. A process as claimed in claim 12 in which any excess of the reducing agent used to reduce the cobamide is decomposed.

14. A process as claimed in claim 1 in which the acylating agent is a carboxylic acid anhydride.

15. A process as claimed in claim 1 in which the reagent condensed with the fully reduced cobamide is 5'-tosyl-adenosine.

16. A process as claimed in claim 1 in which the reagent condensed with the fully reduced cobamide is 5'-tosyl-2',3'-diacetyl-adenosine.

17. A cobamide derivative having the group R attached to the central cobalt atom thereof by carbon-cobalt and sulfur-cobalt linkages where R is selected from the group consisting of lower alkyl, lower alkyl substituted with at least one member selected from the group consisting of monocyclic aryl, nitrogen-containing heterocycle, oxygen-containing heterocycle, nitrogen and oxygen-containing heterocycle, hydroxyl and carboxyl; lower alkoxy, lower alkylthio, lower alkanoyl, benzoyl, lower alkyl-sulfonyl, monocyclic aryl-sulfonyl and monocyclic lower aralkyl-sulfonyl, said cobalt atom being attached in addition only to the heterocyclic nitrogen atoms of the cobamide molecule and when the nitrogen and oxygen-containing heterocycle species of R is Co-5'-deoxyadenosyl, said cobamide is a member selected from the group consisting of Vitamin $B_{12}$ carboxylic acid and anilides, esters and lactams thereof.

18. A cobamide derivative as claimed in claim 17 derived from a member selected from the group consisting of cobinamide, Vitamin $B_{12}$, Vitamin $B_{12}$ monocarboxylic acid, Vitamin $B_{12}$ monocarboxylic acid lactam and Vitamin $B_{12}$ monocarboxylic acid anilide.

19. A cobamide derivative according to claim 17 in which the cobamide moiety is derived from Vitamin $B_{12}$ and the group R is selected from the group consisting of methyl, ethyl, uridinyl, inosinyl and isopropylidine adenosyl.

20. A cobalamide derivative according to claim 17 in which R is lower alkyl and contains from 1 to 5 carbon atoms.

References Cited by the Examiner

UNITED STATES PATENTS

| | | | |
|---|---|---|---|
| 2,721,162 | 10/55 | Fricke | 260—211.5 |
| 2,738,301 | 3/56 | Kaczka et al. | 260—211.5 |
| 2,745,787 | 5/56 | McCormick et al. | 260—211.5 |
| 2,984,661 | 5/61 | Nomine et al. | 260—211.5 |
| 3,033,849 | 5/62 | Sifferd | 260—211.5 |
| 3,037,016 | 5/62 | Barker | 260—211.5 |

FOREIGN PATENTS 1,037,068    8/58    Germany.

LEWIS GOTTS, *Primary Examiner.*